United States Patent

[11] 3,554,486

[72] Inventor Eugene A. Thebado
    25 Smith Drive, Westwood, Mass. 02090
[21] Appl. No. 776,701
[22] Filed Nov. 18, 1968
[45] Patented Jan. 12, 1971

[54] HIGH VACUUM VALVE
    9 Claims, 5 Drawing Figs.
[52] U.S. Cl. .................................................. 251/204,
    251/62, 251/158, 251/214, 251/297, 251/334,
    277/236
[51] Int. Cl. .................................................. F16k 3/10
[50] Field of Search ........................................ 251/158,
    159, 167, 204, 214, 332, 334, 297, 62;
    277/236(Inquired)

[56] References Cited
    UNITED STATES PATENTS
| | | | |
|---|---|---|---|
| 586,433 | 7/1897 | Graffin | 251/204X |
| 813,555 | 2/1906 | Hayden | 251/334 |
| 820,154 | 5/1906 | Towne | 251/334 |
| 1,000,617 | 8/1911 | Messer | 251/158 |
| 2,013,212 | 9/1935 | Hollander | 251/159X |
| 1,056,860 | 3/1915 | Walker | 251/158X |
| 2,196,798 | 4/1940 | Horstmann | 251/334 |
| 3,108,780 | 10/1963 | Wishart. | |
| 3,136,220 | 6/1964 | Kamm | 251/334X |
| 3,337,178 | 8/1967 | Gordon | 251/158X |

Primary Examiner—Clarence R. Gordon
Attorneys—Richard P. Crowley, Philip G. Kiely and Richard L. Stevens ABSTRACT: A valve for use in ultra high vacuum apparatus comprises a valve chamber located at a right angle to the vacuum line containing a gate and a bar cam mounted on a drive shaft communicating with a driving force outside the vacuum line, said bar cam releasably engaging the gate carrying an arcuate spherical sealing element, the engagement of said bar cam and said gate enabling the sealing element to be moved into position in the vacuum line. When the sealing element is located opposite the aperture in the vacuum line to be sealed, the action of the bar cam, as a result of the continuing downward stroke, operates on the sealing element moving it into position in the sealing zone within the aperture and then flexing the sealing element so that the sealing element forcibly seats the edge into the aperture providing a vacuum-tight seal.

PATENTED JAN 12 1971
3,554,486
SHEET 1 OF 2
FIG. 1
FIG. 2
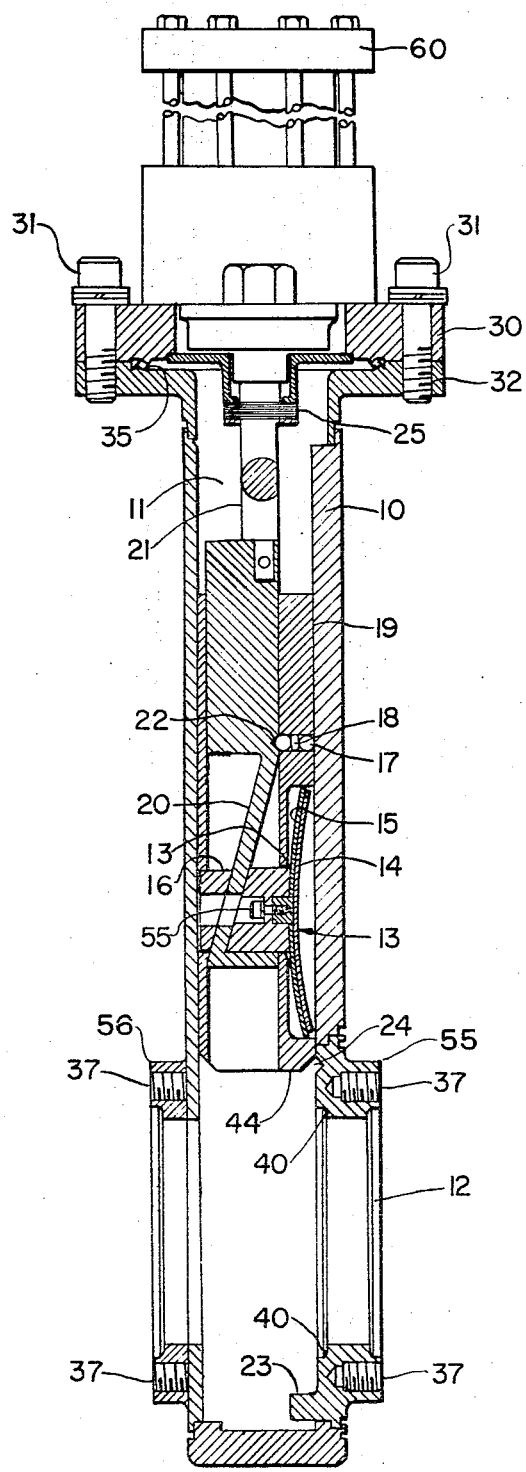
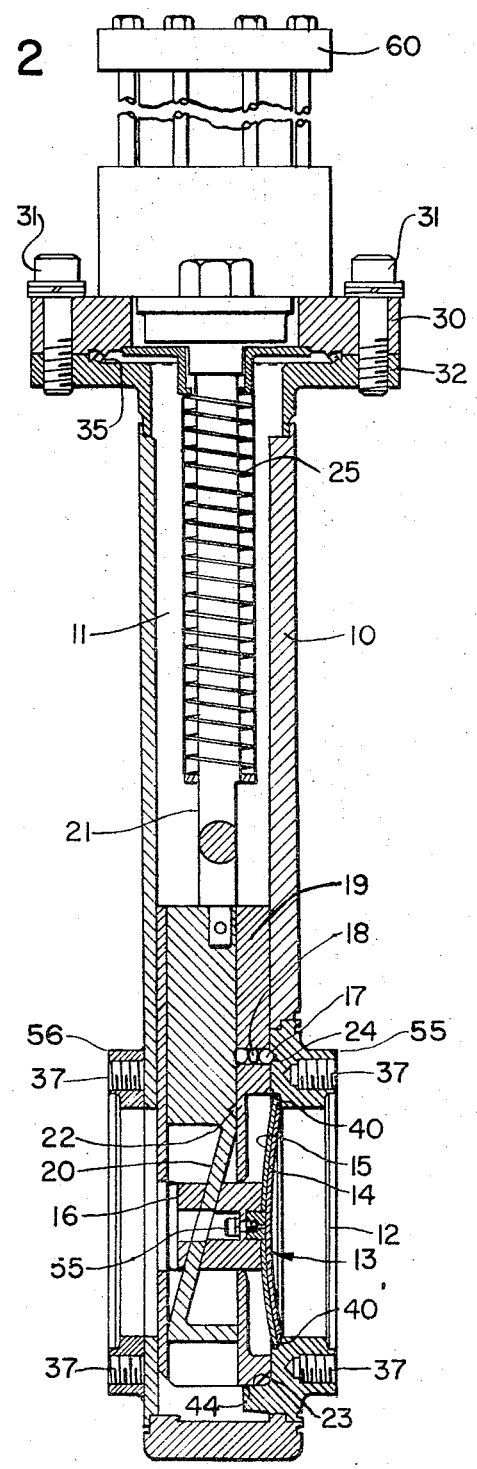
INVENTOR
EUGENE A. THEBADO
BY
Crowley, Kiely & Stevens
ATTORNEYS INVENTOR
EUGENE A. THEBADO
BY
Crowley, Kiely & Stevens
ATTORNEYS

HIGH VACUUM VALVE

BACKGROUND OF THE INVENTION

This invention relates to valves and, more particularly, to valves employed in baked out, i.e., degassed, ultra high vacuum systems.

Apparatus employing vacuum systems are well known, particularly in nuclear and chemical operations, for example, in nuclear reactors, high energy particle accelerators, such as bevatrons, cosmotrons, and cyclotrons, as well as other industrial and scientific devices.

In addition to operating under conditions of extremely high vacuum in many of the above-mentioned operations (in the order of $10^{-10}$ torr), valves in such devices must possess a number of other advantageous qualities. For example, when a valve is closed, it must be reliable since it is difficult, if not impossible, to test for leaks. Thus, a seal failure would only be revealed after the failure had occurred and during the nuclear or chemical operations. Also, the materials in the valve must be stable at, e.g., a temperature of 450° C. for 12 to 15 hours which are the conditions employed to outgas a structure. Of course, under such conditions elastomeric materials or lubricants which might outgas to a considerable degree are not usable. The valves must also be easily installed and reliably operable under conditions of radiation, a gamma flux of $10^9$ roentgens and thermal flux of $10^{17}$ neutrons per square centimeter. It is also desirable that no magnetic materials be employed in any manner that would interfere with energized particles passing through the vacuum system.

One type of conventional valve employed comprises a twin sealing element seated in twin aperture flanges. However, the critical tolerances and extreme forces per linear inch of the seal and friction encountered in the operation makes them unreliable. In addition, the thickness of such a valve limits the range of usefulness.

Other valves currently employed generally are relatively complicated, using a large amount of space in the vacuum line and are subject to frequent failure due to the complexity of operation. Valves employing springs are particularly susceptible to failure because the vacuum conditions act adversely on the ability of the spring to function accurately and reliably.

SUMMARY OF THE INVENTION

A novel valve for use in ultra high vacuum systems has now been found which is not susceptible to the deficiencies of the prior art.

The novel valve of the present invention is composed of an arcuate seal which is moved from a chamber or housing into the vacuum line, i.e., in alignment with the longitudinal axis of the aperture and then moved parallel to the longitudinal axis against a sealing edge to accomplish the seal. On opening the valve, a shaft withdraws a cam in a direction perpendicular to the vacuum line being sealed which operates on the arcuate sealing member, unflexing the sealing member and then withdrawing it from the sealing position in an axial direction, and then out of the vacuum path.

A valve chamber is located at a right angle to the vacuum line and contains in its rectangular interior the valve mechanism. The chamber is under a vacuum because of its communication with the vacuum line. The mechanism includes a bar cam mounted on a shaft that communicates with means for actuating the valve outside the valve chamber. Sealing means are employed to maintain the vacuum in the chamber. The bar cam releasably engages a gate on which the sealing element is carried, thus providing motion to the sealing element for moving it in and out of the vacuum line. When the sealing element is located opposite the aperture, the gate will be disengaged from the bar cam and engaged with the lower chamber wall. The bar cam now continues its downward stroke thereby acting on the hub cam exerting a longitudinal force which is transmitted to the arcuate sealing element flexing it axially, enlarging the diameter whereby it sealingly engages its edge into the aperture flange seat producing a vacuum tight seal.

On the open stroke, the bar cam acts on the hub cam permitting the unflexing of the sealing element and then draws the sealing element into the gate. The bar cam now engages the hub cam and exerts an upward force on the gate, disengaging it from the chamber wall, reengaging it with the bar cam so that the entire mechanism is withdrawn out of the vacuum line.

Since the valve of the present invention is preferably operated by air, the control means can be designed to include a conventional means to control the cam downstroke on each closure within a predetermined range, thus causing the seal life to be extended into hundreds of cycles. Also, manual, automatic, and remote control, and protective controlled circuitry are employed, thus, enabling the valve to be closed or opened in a short period of time, e.g., one second or less. Since the actual sealing element in the valve moves entirely out of the aperture substantially no loss in the diameter of the aperture is encountered as a result of the employment of the valves of the present invention. Because of the extremely low number of moving parts and the mechanical advantages employed to produce the motion of the valve operation, the length of space in the line occupied by the valve is relatively small; in many cases up to 50 percent of the space is employed in the present invention compared with the prior art valves.

BRIEF DESCRIPTION OF THE DRAWING

FIG. 1 is a vertical section of the valve of the present invention showing the sealing means in the open position;

FIG. 2 is a view similar to FIG. 1 wherein the sealing means is illustrated in the closed position;

DETAILED DESCRIPTION

Figure 4:
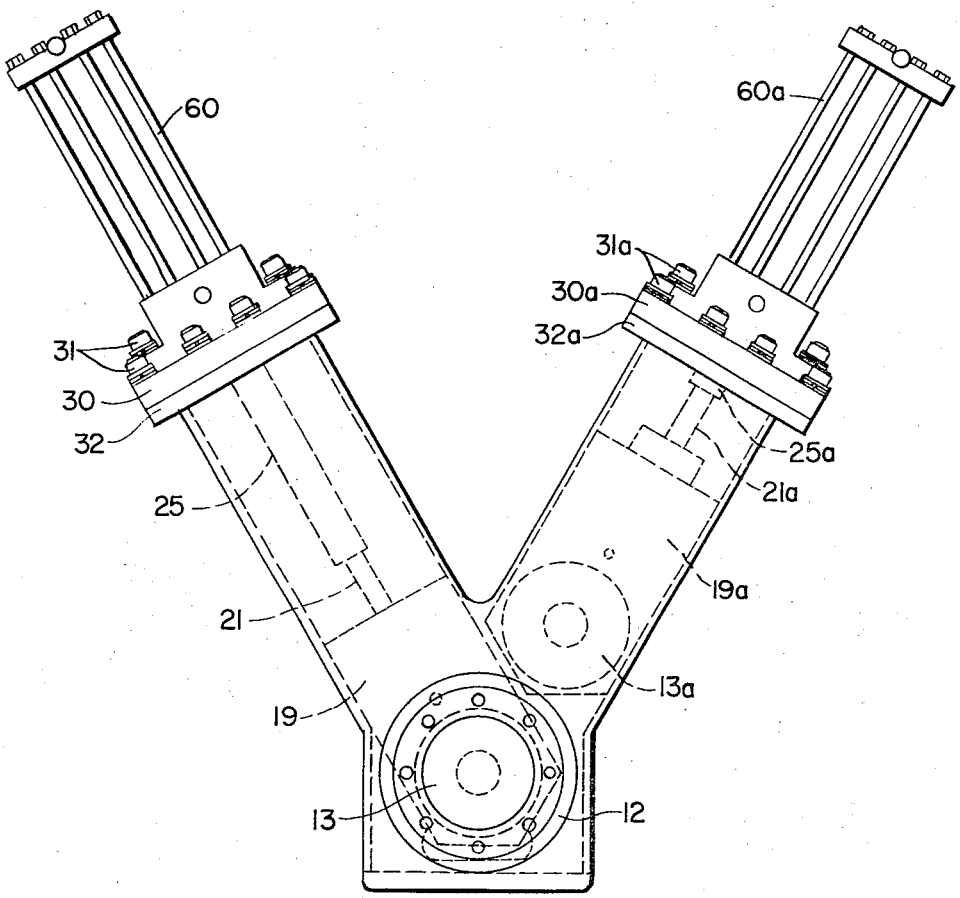
FIG. 4 is a schematic view showing two valves of the present invention mounted together about a single aperture.

Referring now to the drawings, in FIG. 1 shows a valve body 10 defining valve chamber 11 therein. Bar cam 20 and gate 19 is advanced and withdrawn by the action of a shaft 21.

Figure 5:
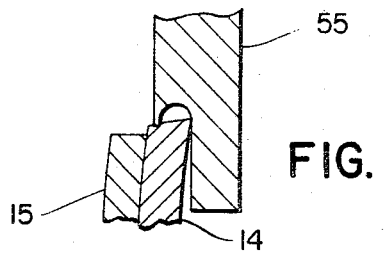
FIG. 5 illustrates the novel sealing action in an enlarged fragmentary view wherein the edge of the sealing element is embedded into the knife edge of the flange.

As shaft 21, sealed from the atmosphere by a welded type bellows 25, begins its downward stroke moving bar cam 20 towards the aperture in the line, gate 19 also moves downward as a result of the engagement between gate 19 and bar cam 20, of the pawl 17 located in slot 18 in gate 19 which engages bar cam 20 in indent 22. As gate 19 and bar cam 20 move downward, the bottom edge 44 of gate 19 contacts seat 23 in the valve body 10 thus stopping the downward motion of gate 19. Bar cam 20, however, continues and becomes disengaged from gate 19 by the movement of pawl 17 in slot 18 laterally from indent 22 into indent 24 located in valve body 10. As bar cam 20 now continues to move downward, it acts on cam 16 providing lateral motion to hub cam 16, moving closure element 13 into aperture flange 55 edgewise, and flexing arcuate seal 14 circumferentially into seat 40 of aperture flange 55 thus sealing aperture 12. FIG. 5 is a fragmentary cross-sectional view showing one edge of seal 14 imbedded in flange 55 by the force from backing plate 15. It should be understood that the knife edge sealing indicated in FIG. 5 is preferred but not critical. Optionally, the flexed seal 14 is forced against a knife edge surface of flange 55.

In opening the valve, shaft 21 is withdrawn from vacuum chamber 11 moving bar cam 20 away from seat 23. The upward motion of bar cam 20 provides a lateral movement to hub cam 16 unflexing closure element 13 and withdrawing the closure elements 13 from its sealing position in aperture flange 55. After the closure element 13 has been transferred out of aperture 12 and into gate 19, indent 22 in member 20 will have been positioned to a point opposite slot 18 in gate 19. The upward motion of bar cam 20 exerted on hub cam 16 will cause pawl 17 to move from indent 24 in valve body 10 to indent 22 in bar cam 20, thus, reengaging bar cam 20 and gate 19, carrying both completely out of aperture 12. Gate 19 is now in position for the next closure cycle.

Shaft 21 is preferably operated by an air cylinder 60 and is vacuum sealed from the atmosphere by a bellows seal 25. While the illustrated bellows seal is preferred, it should be understood that any suitable sealing means may be employed. The bonnet 30 is secured to mounting flange 32 by means of bolts 31. Bonnet seal 35 prevents the loss of vacuum in the bonnet with approximately 50 percent less bolts than is normally called for in similar flanges in the prior art and will be discussed in greater detail in connection with FIG. 3.

The valve closure element 13 is composed of seal 14 and backing plate 15. The closure element is affixed to gate 19 by bolt 55 through hub cam 16 and constitutes an arcuate, flexible, spherical segment which, when seated and flexed, will expand in diameter from the axial force applied thereto. Upon removal of the axial force, the backing plate 15 causes the closure element to again assume its original configuration. In its flexed position, the mechanical force applied through the seal to the aperture flange seat 40, provides a reliable seal. Preferably, seal 14 is composed of OFHC copper or similar metal while the backing plate 15, as well as the rest of the device is composed, preferably of stainless steel or equivalent metal. The use of copper or similar metal for the seal 14 is preferred to ensure that the knife edge disposed in the flange 55 as shown in FIG. 5 bites into or is embedded into the edge of the seal 14. Thus, as well as being composed of materials which are substantially nonmagnetic, the apparatus provides no magnetic interference. In an alternative embodiment, the seal and the seat may be plated with, e.g., silver, gold, lead, and the like.

Figure 3:
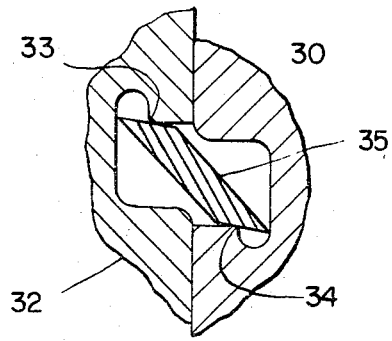
FIG. 3 illustrates the novel bonnet flange sealing means in an enlarged fragmentary view.

FIG. 3 is an enlarged view of flange seal 35. Bonnet 30 contains edge 34 while bonnet flange 32 contains a corresponding edge 33. A rectangular copper or similar metal seal is seated between the knife edges and the bolts 31 are tightened forcing the knife edges into the copper, thus, effecting the seal. The seal is located diagonally between the offset opposed edges. Other suitable materials also include nonferrous metals such as silver or platinum.

In addition to sealing the bonnet, mounting flange 56 and aperture flange 55 may also be sealed by the novel flange seal and construction. Alternatively, conventional sealing means can be employed.

FIG. 4 illustrates the dual use of the valve of the present invention located about a single aperture, to provide a high degree reliability. Air cylinder 60 has been actuated to drive a shaft 21 downward operating on gate 19 to move closure element 13 into position sealing the aperture in the vacuum line. A second closure element 13a is held in an open and standby position wherein gate 19a has been retracted by the action of the air cylinder 60a on shaft 21a. This dual configuration provides a greater reliability than has heretofore been available. Since all sealing elements eventually fail when a leakage is encountered or a seal has terminated its life cycle with one of the sealing elements in this configuration, i.e., sealing element 13, it can be moved out of sealing position while the alternate sealing element 13a can be moved into sealing position with the entire operation occupying as little as three seconds. After the second closure member has been actuated to seal off the vacuum, the bonnet can be removed; for example, bolts 31 can be removed to disengage bonnet 30 from bonnet flange 32; withdrawing the gate mechanism from within the chamber, replacing the seal element 14 merely by loosening bolt 55, replacing a new sealing element and seal 39 and inserting the mechanism again into the body 10. Thus, a quick and ready replacement of the apparatus is provided while preventing the loss of vacuum and minimizing downtime of the vacuum apparatus. This also permits the routine scheduling of maintenance and replacement of a seal eliminating downtime of the apparatus as a result of the valve failures.

As shown in the drawings, the pawl is composed of two ball bearings separated by a washer. It should be understood that the pawl may also be composed of a bar or other suitable means for engaging and disengaging the various elements.

In the construction of the valve of the present invention, it is preferable to provide for the bleeding of any virtual leak areas.

In still another embodiment of the present invention, it may be desirable to mount two opposed gate mechanisms within a single chamber so that the chamber and apparatus can be closed to the vacuum from either side, thus, facilitating replacement or repair on the seal or the mechanism associated therewith.

Thus, the novel valve of the present invention is reliable, fast, economical on space, bakeable, and nonmagnetic. A dry lubricant "tungsten diselenide" or its equivalent is preferably employed to cause all moving parts to function smoothly.

I claim:

1. A method of sealing a vacuum system with a valve, which communicates with a vacuum system through a vacuum line which comprises:
    a. moving perpendicularly with respect to the vacuum line a shaft within the valve chamber, the shaft having closure means thereon, between a first open and a second operable position;
    b. positioning the closure means for axial movement;
    c. continuing the perpendicular movement of the shaft, after the closure element has been positioned, beyond the vacuum line in an unrestricted manner;
    d. moving the closure means on said shaft between a first nonoperable position and a second sealing position in a direction generally perpendicular to the direction of movement of the shaft with which the closure means is associated; e. contacting a valve seat having annular knife edge means disposed in the chamber about an aperture which communicates with the vacuum system;
    f. expanding the circumference of the closure means;
    g. engaging the knife edge means of the valve seat with the closure means; and
    h. sealing the vacuum system from the valve chamber.

2. A valve which communicates with a vacuum system through a vacuum line which comprises:
    a. a chamber in fluid flow communication with a vacuum system, said chamber having an inlet in communication with the vacuum line and an outlet;
    b. seating means disposed within the chamber about the inlet, said seating means characterized by annular knife edge means;
    c. a shaft disposed within the chamber and sealably connected to means outside the chamber for reciprocating said shaft within the chamber in a direction generally perpendicular to the inlet between a first open and a second operable position;
    d. closure means secured to the shaft within the chamber, said closure means adapted to reciprocate with the shaft between its first open position and its second operable position, said closure means adapted to move generally axially with respect to the inlet between a first nonoperable and a second sealing position;
    e. stop means adapted to position the closure means prior to the movement of the closure means in an axial direction, as the shaft continues to move between its first and second position said closure means further having a peripheral edge, the peripheral edge adapted to increase in circumference when the closure means moves to its sealing position and engages said annular knife edge means in an unrestricted movement;
    f. means associated with the shaft to impart axial movement to the closure means when the shaft is moving from its first to its second position, whereby when the shaft with the closure means moves between its first open and second operable position, the closure means is engaged by the stop means to position said closure means for movement in the axial direction, the shaft means after the engagement of the closure means with the stop means continues downwardly in unrestricted movement while the closure means moves between its nonoperable position to its sealing position, the peripheral edge of the closure means engaging knife edged means in the valve seat to provide a fluid-tight seal.

3. The valve of claim 2 wherein the shaft includes gate means and the closure means are secured to said gate means, and further wherein the closure means is flexible.

4. The valve of claim 2 wherein the means associated with shaft to impart horizontal movement to the closure means comprises a bar cam slidably located in said chamber associated with said shaft and further comprising a hub cam adapted to operatively engage said bar cam whereby on the movement of the shaft from its first to its second position the interaction of the downward motion of the shaft on said bar cam exerts horizontal motion to said hub cam and the closure means.

5. The valve of claim 2 wherein the outlet of the chamber is substantially aligned with the inlet of said chamber and further wherein the closure means comprises an arcuate generally spherical element, and wherein the seating means disposed about the inlet comprises an aperture adapted to receive the sealing edge of the closure means.

6. The valve of claim 2 wherein the closure means comprises a sealing member and a backup plate secured to said sealing member.

7. The valve of claim 2 which includes at least a first and second chamber said chambers being in the same plane about the inlet and each said chamber having closure means therein.

8. The valve of claim 2 wherein the closure means comprises a sealing member and a backup plate secured to said member and the sealing member is copper and said backup plate is stainless steel.

9. The valve of claim 2 wherein a bar cam is slidably located in said chamber and associated with the shaft, a gate is disposed within the chamber and adapted for movement with the shaft and wherein the closure means are secured to said gate, and further wherein the means for moving the closure means laterally comprises a hub cam adapted to operatively engage the bar cam and wherein the closure means comprises a generally flexible circular-type closure element.